July 27, 1937. H. W. SANFORD Re. 20,457

WHEEL AND AXLE STRUCTURE

Original Filed Nov. 25, 1930 5 Sheets-Sheet 1

INVENTOR.
Hugh W. Sanford
BY Cyrus Rolle
ATTORNEY

July 27, 1937. H. W. SANFORD Re. 20,457

WHEEL AND AXLE STRUCTURE

Original Filed Nov. 25, 1930 5 Sheets-Sheet 2

INVENTOR.
Hugh W. Sanford
BY Cyrus Keller
ATTORNEY

WHEEL AND AXLE STRUCTURE

Original Filed Nov. 25, 1930 5 Sheets-Sheet 3

INVENTOR
Hugh W. Sanford
BY Cyrus Keller
ATTORNEY

WHEEL AND AXLE STRUCTURE

Original Filed Nov. 25, 1930 5 Sheets-Sheet 4

INVENTOR.
Hugh W. Sanford
By Cyrus Rector
ATTORNEY

July 27, 1937. H. W. SANFORD Re. 20,457

WHEEL AND AXLE STRUCTURE

Original Filed Nov. 25, 1930 5 Sheets-Sheet 5

INVENTOR.
Hugh W. Sanford
BY Cyrus Rolz
ATTORNEY

Reissued July 27, 1937 Re. 20,457

UNITED STATES PATENT OFFICE 20,457

WHEEL AND AXLE STRUCTURE

Hugh W. Sanford, Knoxville, Tenn.

Original No. 1,840,412, dated January 12, 1932, Serial No. 498,172, November 25, 1930. Application for reissue January 11, 1934, Serial No. 706,302

28 Claims. (Cl. 295—44)

This invention relates to such wheel and axle structures as are embodied in mine cars and similar cars.

The object of the invention is to produce a structure wherein the parts are so arranged that the mine mechanic will not need to use judgment in order to get the finest adjustment of parts, namely, the play between the balls and the races —this being then the play of the wheel endwise on the axle. In other words, the object is to so organize the structure that the mine mechanic need only draw the binding bolts as tight as he can draw them—whereupon the interior adjustments of play are accurately arranged.

In the accompanying drawings.

Figure 1:
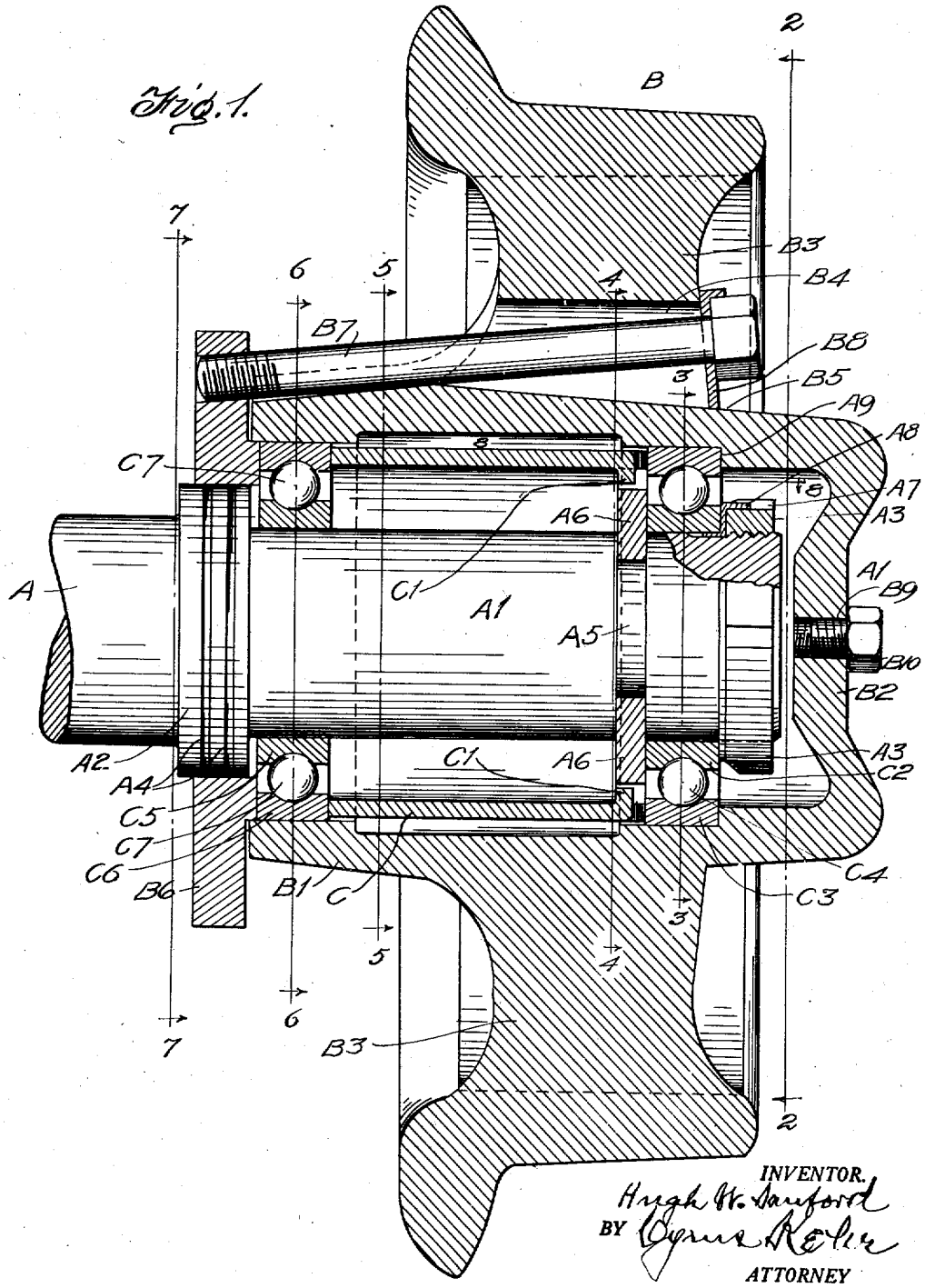
Fig. 1 is a longitudinal, upright section along the axial line of the structure approximately on the line 1—1 of Fig. 2.
Figure 2:
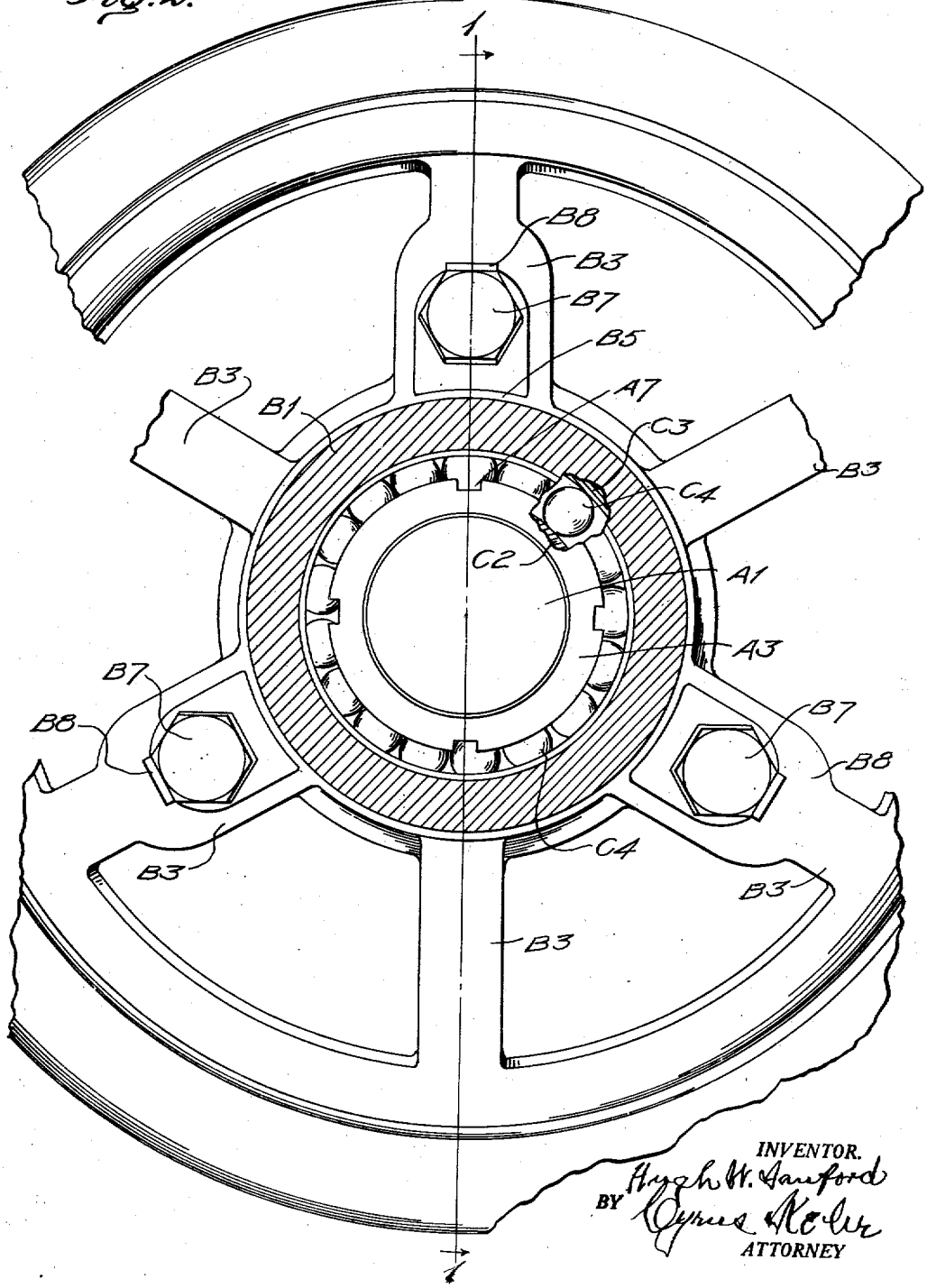
Fig. 2 is an upright transverse section on the line, 2—2, of Fig. 1, looking toward the left.
Figure 3:
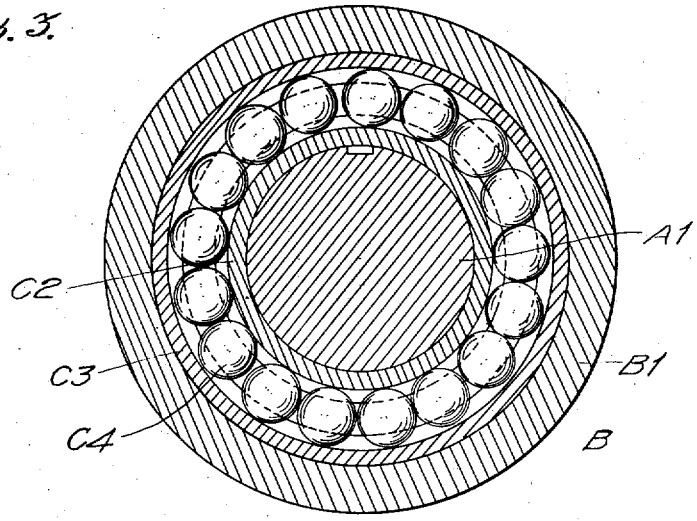
Fig. 3 is an upright transverse section on the line, 3—3, of Fig. 1, looking toward the right.
Figure 4:
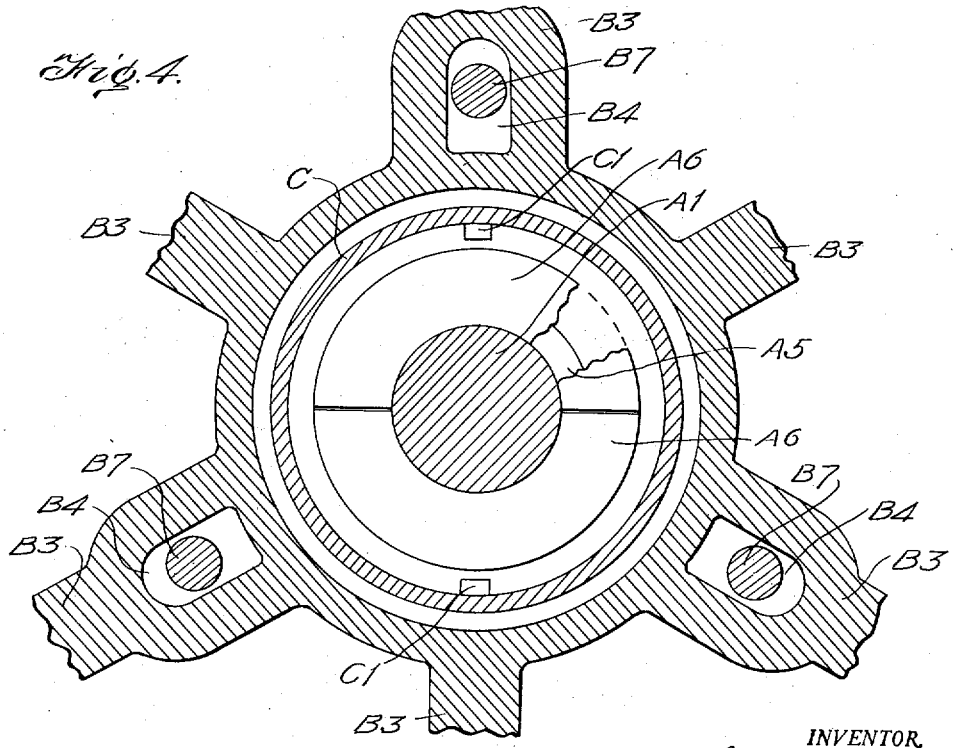
Fig. 4 is an upright transverse section on the line, 4—4, of Fig. 1, looking toward the right.
Figure 5:
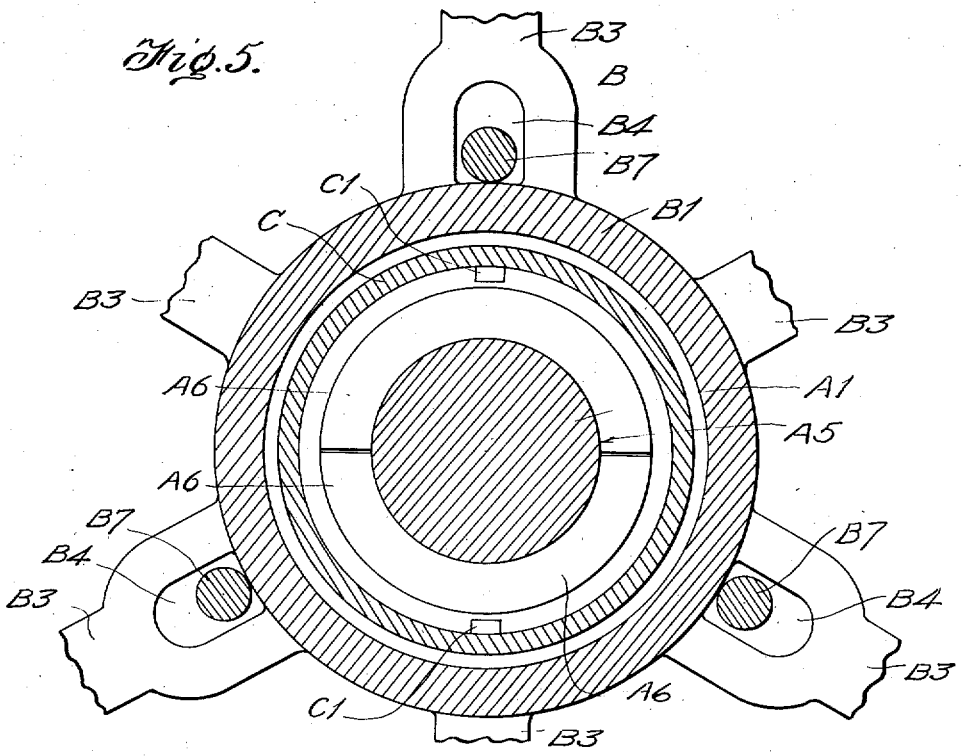
Fig. 5 is an upright transverse section on the line, 5—5, of Fig. 1, looking toward the right.
Figure 7:
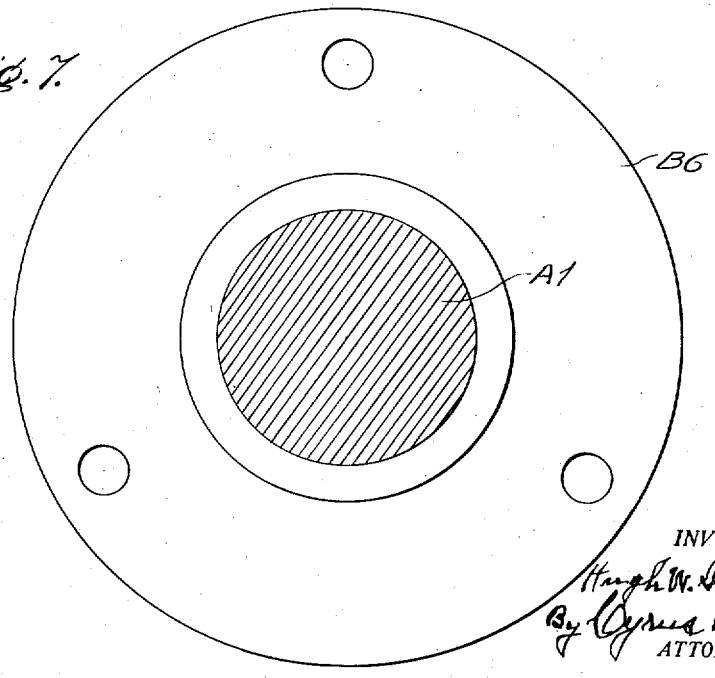
Fig. 7 is an upright transverse section on the line, 7—7, of Fig. 1, looking toward the right.
Figure 6:
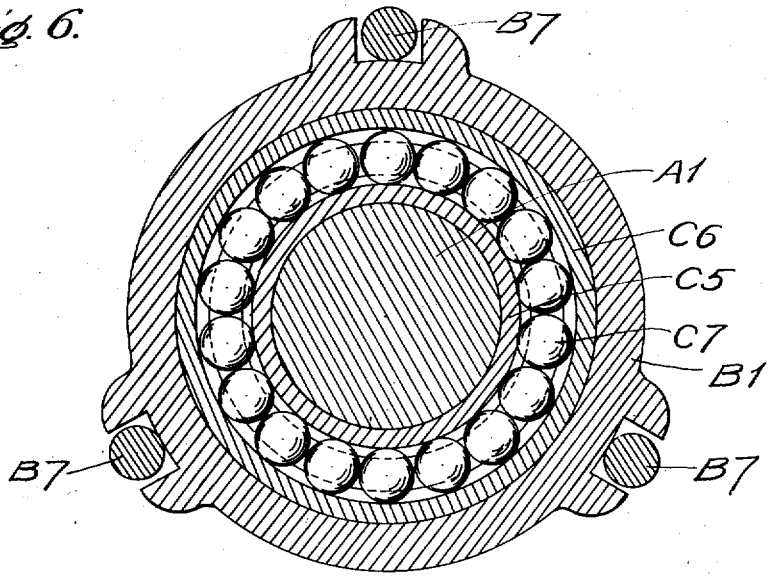
Fig. 6 is an upright transverse section on the line, 6—6, of Fig. 1 looking toward the right.
Figure 8:
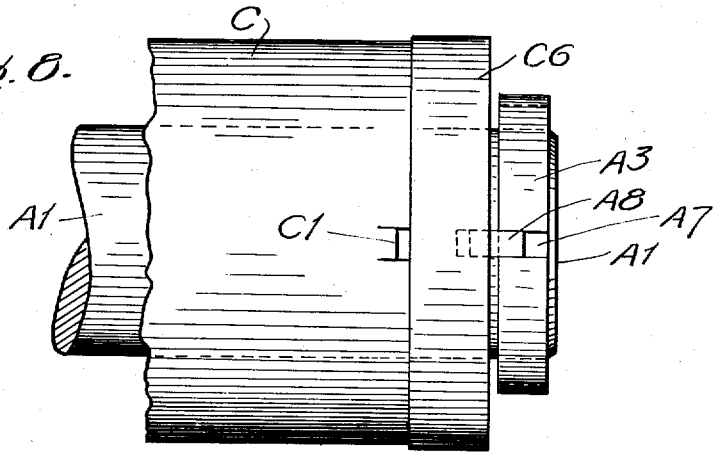
Fig. 8 is a horizontal section on the line, 8—8, of Fig. 1, looking downward.

Referring to said drawings, A is the body of the axle. A1 is the journal. A2 is an annular collar integral with the axle between the body, A, and the journal. The outer or right-hand end of the journal is threaded to receive a ring-form nut, A3. The wheel B, having a hub, B1, and an end wall, B2, surrounds the journal. In the form shown in the drawings, the wheel has six spokes, B3. The alternate spokes have horizontal openings, B4, extending through the spokes approximately parallel to the journal, A1.

At the inner end of the hub (the end toward the body, A, of the axle) a ring-form end plate, B6, surrounds the collar, A2, rotatably. On the collar, A2, are grooves, A4, adapted to receive packing to prevent passage of lubrication from the interior of the hub and to prevent the passage of dirt from the exterior of the hub. Through each spoke opening, B4, there is inserted a binding bolt, B7, the head of the bolt being at the outer or right hand face of the spoke and the opposite end of the bolt being threaded into the ring-form end plate, B6. A locking plate, B8, surrounds the bolt between the adjacent face of the spoke and the head of the bolt and bears downward on the adjacent face of the hub to prevent turning of said plate on the bolt. When the bolt has been sufficiently turned to adjust the ring-form plate, B6, a suitable part of the plate, B8, is to be bent over one of the faces of the bolt head. The drawings show the outer part (the part the farther from the hub) so bent.

In the form of the structure illustrated by these drawings, the function of these binding bolts is to draw the ring form end plate B6, toward, but not against, the inner or adjacent end of the hub. The function of said bolts is to draw the end plate against an adjacent ball race, as will be described further on.

Parallel to and spaced from the nut, A3, a circumferential channel, A5, is formed in the journal A1, to receive the two halves of a split ring, A6.

A hub bushing, C, surrounds and is spaced from said split ring and extends toward the end plate, B6. Opposite each half of the split ring, A6, a part of the bushing is bent downward to form a tongue, C1, directed toward the split ring to hold the two parts of the ring in the channel, A5, of the journal.

Between the nut, A3, and the split ring, A6, a ball race, C2, surrounds the journal and bears against said nut and said split ring. For adjustment, the nut is driven against the ball race, whereby the ball race is pressed against the split ring and the latter is pressed against the inner wall of the channel, A5. Thus the split ring forms an abutment for that ball race. On the nut, A3, are circumferential notches, A7, any one of which may receive one end of a locking member, A8, the other end of said member being held between the journal and the ball race, C2. When the nut, A3, is to be turned, the outer end of the locking member, A8, is to be bent upward out of the adjacent notch, A7.

Concentric to the ball race, C2, is a companion ball race, C3. Between those ball races are balls, C4. The ball race, C3, rests against a shoulder, A9, formed on the interior of the hub. The outer end of the hub bushing, C, normally bears against the ball race, C3, and presses said race against the hub shoulder, A9.

Near the axle collar, A2, the ball race, C5, surrounds the journal, A1. Concentric to and surrounding that race is a ball race, C6. Between those two races are balls, C7. The race, C6, bears against the adjacent end of the hub bushing, C, and the adjacent face of the ring-form end plate, B6, bears against the other face of said ball race, the end plate making contact with that race and not with the adjacent end of the hub, space being left between said end plate and the end of the hub, as shown by the drawings. The binding bolts, B7, are to be set to forcibly maintain engagement of the end plate with the ball race, C6, whereby maintained binding engagement is made between the end plate and said ball race and the bushing and the ball race, C3, and the hub shoulder, A9. Thus the ball race, C6, and the ball race, C3, are locked. I have already noted that the ball race, C2, is held immovably between the nut, A3, and the split ring, A6. The ball race, C5, is not held against movement parallel to the length of the journal. That ball race is "floating".

While the ring-form end plate, B6, performs a part in binding the ball races, C6 and C3, that end plate also serves as a closure for the end of the hub.

In addition to the function performed relative to the ball race, C2, the nut, A3, forms an abutment for holding the hub against outward movement on the axle; and in addition to its function relative to the ball race, C2, the split ring, A6, forms an abutment for holding the hub against inward movement on the axle, whereby the hub end wall is held away from the end of the axle, the ball races, C2 and C3, and the balls, C4, making needed engagement with the hub and the nut and the split ring. This additional functioning is to be noted in connection with the claims.

In the form shown in the drawings, the lubricant is to be introduced through the port, B9, formed in the end wall, B2, of the hub, B, and normally closed by a screw plug, B10, of any desired form.

From the foregoing it will be seen that this invention provides for a wheel hub of maximum simplicity, cast as a unit and requiring a minimum amount of machine work without need of precise accuracy of machine work. It will also be observed that provision is made for retaining grease in the lower part of the hub to a height halfway between the journal, A1, and the bottom of the hub, the leakage, in the limited desired quantity being between the lower part of the annular collar, A2, and the adjacent part of the ring-form plate, B6.

While this invention has been mentioned as applicable to wheel and axle structures such as are embodied in mine cars and similar cars, it is to be understood that the invention may be embodied in wheel and axle structures to be used otherwise than in such cars.

I claim as my invention:

1. The combination with an axle, of a wheel having a hub surrounding the axle and having a sealing wall extending across the end of the axle and the hub having in its interior and adjacent the end of the axle an abutment directed toward the inner end of the hub, abutment means adjustably secured on the outer end of the axle and directed toward the inner end of the hub, a pair of ball races surrounding the axle, the inner of said ball races bearing against the axle abutment and the outer of said races bearing against the hub abutment, balls between said races, a second pair of ball races surrounding the axle within and adjacent the inner end of the hub, a hub bushing located between the two pairs of ball races and having one end bearing against the outer race of one pair and having its other end bearing against the outer race of the other pair, means at the inner end of the hub for adjustably pressing against the outer race of the adjacent pair of races for pressing said race against the adjacent end of the hub bushing, the inner race of said second pair of ball races being freely slidable lengthwise of the axle to accommodate for irregularities in the bushing and outer races, and means accessible at the outer end of the hub for releasably locking the wheel to said pressing means.

2. The combination with an axle, of a wheel having a hub surrounding the axle and having a sealing wall extending across the end of the axle and the hub having in its interior and adjacent the end of the axle an abutment directed toward the inner end of the hub, abutment means adjustably secured on the outer end of the axle and directed toward the inner end of the hub, a pair of ball races surrounding the axle, the inner of said ball races bearing against the axle abutment and the outer of said races bearing against said hub abutment, balls between said races, a second pair of ball races surrounding the axle within and adjacent the inner end of the hub, a hub bushing located between the two pairs of ball races and having one end bearing against the outer race of one pair and having its other end bearing against the outer race of the other pair, a ring-form end plate at the inner end of the hub, and means attached to the wheel and accessible from the outer end of the hub for adjustably pressing said plate against the outer race of the adjacent pair of races for pressing said race against the adjacent end of the hub bushing, the inner race of said second pair of ball races being freely slidable lengthwise of the axle to accommodate for irregularities in the bushing and outer races.

3. The combination with an axle, of a wheel having a hub surrounding the axle and having a sealing wall extending across the end of the axle and the hub having in its interior and adjacent the end of the axle an abutment directed toward the inner end of the hub, abutment means adjustably secured on the outer end of the axle and directed toward the inner end of the hub, a pair of ball races surrounding the axle, the inner of said ball races bearing against the axle abutment and the outer of said races bearing against said hub abutment, balls between said races, a second pair of ball races surrounding the axle within and adjacent the inner end of the hub, a hub bushing located between the two pairs of ball races and having one end bearing against the outer race of one pair and having its other end bearing against the outer race of the other pair, a ring-form end plate at the inner end of the hub, and bolts attached to the wheel and accessible from the outer end of the hub for adjustably pressing said plate against the outer race of the adjacent pair of races for pressing said race against the adjacent end of the hub bushing, the inner race of said second pair of ball races being freely slidable lengthwise of the axle to accommodate for irregularities in the bushing and outer races.

4. The combination with an axle, of a wheel having a hub surrounding the axle and having a sealing wall extending across the end of the axle and the hub having in its interior and adjacent the end of the axle an abutment directed toward the inner end of the hub, abutment means adjustably secured on the outer end of the axle, an end plate surrounding the axle near the inner end of the hub, a hub bushing, a pair of ball races the inner of said pair bearing against said axle abutment and the outer of said pair being in contact with said hub abutment and the adjacent end of the hub bushing, balls between said races, another pair of ball races surrounding the axle near the end of the hub and having its outer race between the hub bushing and said end plate and in contact with said members, means attached to the wheel and accessible from the outer end of the hub for pressing said plate against said outer race, the inner race of said second pair of ball races being freely slidable lengthwise of the axle to accommodate for irregularities in the bushing and outer races, and balls between said races.

5. The combination with an axle, of a wheel having a hub surrounding the axle and having a sealing wall extending across the end of the axle and the hub having in its interior and adjacent the end of the axle an abutment directed toward the inner end of the hub, abutment means adjustably secured on the outer end of the axle, an end plate surrounding the axle near the inner end of the hub, a hub bushing, a pair of ball races the inner of said pair bearing against said axle abutment and the outer of said pair being in contact with said hub abutment and the adjacent end of the hub bushing, balls between said races, another pair of ball races surrounding the axle and having its outer race between the hub bushing and said end plate and in contact with said members, bolts attached to the wheel and accessible from the outer end of the hub for drawing said plate against said outer race, the inner race of said second pair of ball races being freely slidable lengthwise of the axle to accommodate for irregularities in the bushing and outer races, and balls between said races.

6. The combination with an axle, of a wheel having a hub surrounding the axle and having a sealing wall extending across the end of the axle and the hub having in its interior and adjacent the end of the axle an abutment directed toward the inner end of the hub, abutment means adjustably secured to the outer end of the axle, an end plate surrounding the axle near the inner end of the hub, a hub bushing, a pair of ball races the inner of said pair bearing against said axle abutment and the outer of said pair being in contact with said hub abutment and the adjacent end of the hub bushing, balls between said races, and another pair of ball races surrounding the axle near the inner end of the hub and having its outer race between the hub bushing and said end plate and in contact with said members, bolts extending through the wheel and threaded to said plate for drawing the plate against said outer race, the inner race of said second pair of ball races being freely slidable lengthwise of the axle to accommodate for irregularities in the bushing and outer races.

7. The combination with an axle, of a wheel having a hub surrounding the axle and having a sealing wall extending across the end of the axle and the hub having in its interior and adjacent the end of the axle an abutment directed toward the inner end of the hub, an abutment nut threaded around the axle at its outer end, an end plate surrounding the axle near the inner end of the hub, a hub bushing, a pair of ball races, the inner of said pair bearing against said abutment nut and the outer of said pair being in contact with said hub abutment and the adjacent end of the hub bushing, balls between said races, another pair of ball races surrounding the axle near the end of the hub and having its outer race between the hub bushing and said end plate and in contact with said members, means attached to the wheel and accessible from the outer end of the hub for pressing said plate against said outer race, the inner race of said second pair of ball races being freely slidable lengthwise of the axle to accommodate for irregularities in the bushing and outer races, and balls between said races.

8. The combination with an axle, of a wheel having a hub surrounding the axle and having a sealing wall extending across the end of the axle and the hub having in its interior and adjacent the end of the axle an abutment directed toward the inner end of the hub, abutment means adjustably secured on the outer end of the axle, an end plate surrounding the axle near the inner end of the hub, a hub bushing, a pair of ball races, the inner of said pair bearing against said adjustable axle abutment means, a stationary axle abutment in contact with the other side face of said inner race, balls between said races, another pair of ball races surrounding the axle near the end of the hub and having its outer race between the hub bushing and said end plate and in contact with said members, means attached to the wheel and accessible from the outer end of the hub for pressing said plate against said outer race, the inner race of said second pair of ball races being freely slidable lengthwise of the axle to accommodate for irregularities in the bushing and outer races, and balls between said races.

9. The combination with an axle having a circumferential channel near its outer end, of a wheel having a hub surrounding the axle and having in its interior and adjacent the end of the axle an abutment directed toward the inner end of the hub, abutment means adjustably secured on the outer end of the axle, a split ring seated in said axle channel, and a hub bushing positioned to prevent movement of the parts of said split ring out of said channel.

10. The combination with an axle, of a wheel having an integral hub and tread, said hub surrounding the axle, said hub having in its interior an abutment directed toward the inner end of the hub, an inner pair of ball races, an outer pair of ball races surrounding the axle near its outer end, abutment means fixed with respect to the outer end of the axle to limit the outward movement of the inner race of the outer pair of races parallel to the axle, a separating bushing surrounding the axle and lying between said outer pair of ball races and said inner pair of ball races and the ends of said bushing being in abutting relation with one race of each of said pairs, an end sealing means at the inner end of the hub in adjustable abutting relation with the outer race of said inner pair of races, the inner race of said inner pair of ball races being freely slidable lengthwise of the axle to accommodate for irregularities in the bushing and outer races, and means for pressing said sealing means against said outer race of said inner pair of races.

11. The combination with an axle, of a wheel structure having a wheel hub encircling the axle and having an upright sealing wall at its outer end, at least two sets of anti-friction bearings between the hub and axle, axle race means for the anti-friction bearings, abutment means adjustably and releasably secured at the outer end of the axle and in abutting relation with an outer end of the axle race means, concentric restraining means encircling the axle at the inner end of the hub and releasably secured to the wheel structure, hub race means for the anti-friction bearings, an abutment within the wheel hub adjacent the end of the axle and directed toward the inner end of the wheel hub and in abutting relation with an outer end of the hub race means, screw shafts for adjustably pressing said concentric restraining means outwardly toward the inner end of the hub race means whereby the inward movement of said hub race means relative to the hub is limited, said shafts being releasably and adjustably secured to the wheel structure at least in part externally of said hub and extending outwardly from said restraining means toward the outer side of said wheel structure.

12. The combination with an axle, of a wheel structure having a wheel hub encircling the axle and having an upright sealing wall at its outer end integral with said hub, at least two sets of anti-friction bearings between the hub and axle, axle race means for the anti-friction bearings, abutment means adjustably and releasably secured at the outer end of the axle and in abutting relation with an outer end of the axle race means, concentric restraining means encircling the axle at the inner end of the hub and releasably secured to the wheel structure, hub race means for the anti-friction bearings, an abutment within the wheel hub adjacent the end of the axle and directed toward the inner end of the wheel hub and in abutting relation with an outer end of the hub race means, screw shafts for adjustably pressing said concentric restraining means outwardly toward the inner end of the hub race means whereby the inward movement of said hub race means relative to the hub is limited, said shafts being releasably and adjustably secured to the wheel structure externally of said hub and extending outwardly from said restraining means toward the outer side of said wheel structure.

13. The combination with an axle, of a wheel structure having a wheel hub encircling the axle and having an upright sealing wall at its outer end, at least two sets of anti-friction bearings between the hub and axle, axle race means for the anti-friction bearings, abutment means adjustably and releasably secured at the outer end of the axle and in abutting relation with an outer end of the axle race means, concentric restraining means encircling the axle at the inner end of the hub and releasably secured to the wheel structure, hub race means for the anti-friction bearings, an abutment within the wheel hub adjacent the end of the axle and directed toward the inner end of the wheel hub and in abutting relation with an outer end of the hub race means, screw shafts for adjustably pressing said concentric restraining means outwardly toward the inner end of the hub race means whereby the inward movement of said hub race means relative to the hub is limited, said shafts being releasably and adjustably secured to the wheel structure at least in part externally of said hub and extending outwardly from said restraining means toward the outer side of said wheel structure, whereby the pressure of said restraining means prevents the rotation of the hub race means within the hub.

14. The combination with an axle, of a wheel structure having a wheel hub encircling the axle and having an upright sealing wall at its outer end, at least two sets of anti-friction bearings between the hub and axle, axle race means for the anti-friction bearings, abutment means adjustably and releasably secured at the outer end of the axle and in abutting relation with an outer end of the axle race means, concentric restraining means encircling the axle at the inner end of the hub and releasably secured to the wheel structure, hub race means for the anti-friction bearings, an abutment within the wheel hub adjacent the end of the axle and directed toward the inner end of the wheel hub and in abutting relation with an outer end of the hub race means, screw shafts for adjustably pressing said concentric restraining means outwardly toward the inner end of the hub race means whereby the inward movement of said hub race means relative to the hub is limited, said shafts being releasably and adjustably secured to the wheel structure at least in part externally of said hub and extending outwardly from said restraining means toward the outer side of said wheel structure, whereby the wheel hub may be entirely removed from the axle and the anti-friction bearings by unthreading the screw shafts.

15. The combination with an axle, of a wheel structure having integral tread and hub, said hub encircling the axle and having an upright sealing wall at its outer end, at least two sets of anti-friction bearings between the hub and axle, axle race means for the anti-friction bearings, abutment means adjustably and releasably secured to the outer end of the axle and in abutting relation with an outer end of the axle race means, concentric restraining means encircling the axle at the inner end of the hub and releasably secured to the wheel structure, hub race means for the anti-friction bearings, only one of said race means including a spacing portion separating the two sets of anti-friction bearings and the other race means having separated race portions for floating of one of said portions relative to the other, an abutment within the wheel hub adjacent the end of the axle and directed toward the inner end of the wheel hub and in abutting relation with an outer end of the hub race means, and means for adjustably pressing said concentric restraining means outwardly toward the inner end of the hub race means whereby the inward movement of said hub race means relative to the hub is limited, said pressing means being accessible from the outer end of the wheel hub and being releasably and adjustably secured to the wheel structure at least in part externally of said hub.

16. The combination with an axle, of a wheel structure having a wheel hub encircling the axle and having an upright sealing wall at its outer end, at least two sets of anti-friction bearings between the hub and axle, axle races for the anti-friction bearings, an abutment shoulder secured to the axle adjacent the inner end of the hub and adjacent the inner end of an axle race, abutment means adjustably and releasably secured to the outer end of the axle and in abutting relation with an outer end of an axle race, concentric restraining means encircling the axle at the inner end of the hub and releasably secured to the wheel structure, hub race means for the anti-friction bearings, an abutment within the wheel hub adjacent the end of the axle and directed toward the inner end of the wheel hub and in abutting relation with the outer end of the hub race means, screw shafts for adjustably pressing said concentric restraining means outwardly toward the inner end of the hub race means whereby the inward movement of said hub race means relative to the hub is limited, said shafts being releasably and adjustably secured to the wheel structure at least in part externally of said hub and extending outwardly from said restraining means toward the outer side of the wheel structure.

17. In combination with an axle having a rigidly secured shoulder abutment spaced from its end, of a wheel structure having an integral hub and tread, said hub extending over a portion of the axle, a sealing wall integral with the hub beyond the outer end of the axle, a plurality of sets of anti-friction bearings between the hub and axle, restraining wall means at the inner end of the hub encircling the axle and secured releasably and adjustably to the wheel structure by securing means extending longitudinally outwardly externally of the hub from said restraining means, axle abutment means within the hub releasably secured to the axle at the outer end thereof, hub abutment means inside the hub near its outer end and facing inwardly, tubular means at least in part between the hub and the anti-friction bearings and between the restraining wall means and the hub abutment means whereby the longitudinal movement of said tubular means relative to the hub is limited, said tubular means including exterior races for the anti-friction bearings and axle races for the anti-friction bearings disposed with the innermost face of an axle race adjacent and spaced from the axle shoulder abutment and with the outermost face of an axle race in abutting relation with the axle abutment means at the outer end of the axle, the axle race adjacent the shoulder abutment being freely slidable toward the end of the axle to accommodate for irregularities in the tubular means.

18. In a wheel and axle structure as described, the combination with an axle having an abutment shoulder spaced from the outer end of the axle, and axle abutment means releasably secured to the outer end of the axle, of a wheel structure having a hub, at least two sets of anti-friction bearings for the wheel structure having axle races so disposed that inward movement of an axle race along the axle is limited by the axle abutment shoulder and outward movement of an axle race along the axle is limited by the axle abutment means and one of said axle races being free to slide toward the other, outer bushing and race means for holding the anti-friction bearings securely on the axle when mounted between the axle abutment shoulder and the axle abutment means, the wheel hub being loosely received over the bushing and race means and having a sealing wall at its outer end, said hub having an abutment near its outer end facing inwardly for limiting the inward movement of the wheel hub over the bushing and race means, a restraining wall at the inner end of the wheel hub encircling the axle and releasably and adjustably secured to the wheel structure and in abutting relation with the inner end of the bushing and race means for limiting the outward movement of the hub relative to the bushing and race means when the restraining wall is secured to the wheel structure, and screw shafts removably and adjustably connected with said restraining means and with the wheel structure externally of the hub and extending longitudinally outwardly from the restraining means toward the outside of the wheel structure.

19. In a wheel and axle structure, the combination with an axle, of a wheel structure having a hub, a plurality of rotary anti-friction bearings inside the wheel hub and encircling the axle at one end, wearing and retaining means between the bearings and the axle, wearing and retaining means between the bearings and the hub and fitting the hub loosely, a shoulder abutment on the axle inside the first-mentioned wearing and retaining means for limiting the inward axial movement of said means, removable and adjustable abutment means at the outer end of the axle for limiting the outward axial movement of the first-mentioned wearing and retaining means, and for retaining the rotary bearings in position for rotary motion between the first-mentioned and second-mentioned wearing and retaining means when the wheel hub is removed, a loose sealing wall encircling the axle at the inner end of the hub and in abutting relation with the inner end of the second-mentioned wearing and retaining means and secured removably and adjustably to the wheel structure by bolts extending to the outer side of the wheel structure, and an abutment within the hub at its outer end and facing inwardly in abutting relation with the outer end of the second-mentioned wearing and retaining means.

20. The combination with an axle, of a wheel structure having a wheel hub encircling the axle and having an upright sealing wall at its outer end, at least two sets of anti-friction bearings between the hub and axle, axle races for the anti-friction bearings and mechanically separated from each other for relative axial movement, an abutment shoulder secured to the axle to restrain inward movement of one of the axle races relative to the axle, abutment means adjustably and releasably secured at the outer end of the axle in abutting relation with the outer end of one of the axle races, concentric restraining means encircling the axle at the inner end of the hub and releasably secured to the wheel structure, hub race means having race grooves for the anti-friction bearings, an abutment within the wheel hub adjacent the end of the axle and directed toward the inner end of the wheel hub in abutting relation with an outer end of the hub race means, screw shafts adjustably pressing said concentric restraining means outwardly toward the inner end of the hub race means whereby the inward movement of said hub race means relative to the hub is limited, said shafts being releasably and adjustably secured to the wheel structure separate from said hub and extending outwardly from said restraining means toward the outer side of said wheel structure.

21. The combination with a mine car axle, of a wheel structure having a wheel hub encircling the axle and having an upright sealing wall at its outer end integral with said hub, at least two sets of anti-friction bearings between the hub and axle, axle race means for the anti-friction bearings, abutment means adjustably and releasably secured at the outer end of the axle and in abutting relation with an outer end of the axle race means, concentric restraining means encircling the axle at the inner end of the hub in spaced relation with the inner end of the hub and releasably secured to the wheel structure, hub race means for the anti-friction bearings, only one of said race means including a spacing portion separating the two sets of anti-friction bearings and the other race means having separated race portions for floating of one of said portions relative to the other, an abutment within the wheel hub adjacent the end of the axle and directed toward the inner end of the wheel hub and in abutting relation with a portion of the hub race means, and means for adjustably pressing said concentric restraining means outwardly toward the inner end of the hub race means, whereby the inward movement of said hub race means relative to the hub is limited, said pressing means being releasably and adjustably secured to the wheel structure and at least a part of said pressing means being located externally of said wheel hub, and said pressing means being operable from the outer side of the wheel structure and between the wheel axis and the tread of the wheel for releasing and adjusting said restraining means.

22. The combination with a mine car axle, of a wheel structure having a solid wheel hub encircling the axle and having an upright sealing wall at its outer end, at least two sets of anti-friction bearings between the hub and axle, axle race means for the anti-friction bearings, abutment means adjustably and releasably secured at the outer end of the axle and in abutting relation with an outer end of the axle race means, concentric restraining means encircling the axle at the inner end of the hub in spaced relation with the inner end of the hub and inner side of the wheel structure for adjustment axially relative thereto, and releasably secured to the wheel structure, hub race means for the anti-friction bearings, only one of said race means including a spacing portion separating the two sets of anti-friction bearings and the other race means having separated race portions for floating of one of said portions relative to the other, an abutment within the wheel hub adjacent the end of the axle and directed toward the inner end of the wheel hub and in abutting relation with a portion of the hub race means, and means for adjustably pressing said concentric restraining means outwardly toward the inner end of the hub race means whereby the inward movement of said hub race means relative to the hub is limited, said pressing means being releasably and adjustably secured to the wheel structure and at least a part of said pressing means being located externally of said wheel hub, and said pressing means being operable from the outer side of the wheel structure and between the wheel axis and the tread of the wheel for releasing and adjusting said restraining means.

23. In a wheel and axle structure, a wheel having a hollow hub encircling the axle and having an upright sealing wall at its outer end, two sets of anti-friction bearings between the hub and axle, axle race means having tracks for the anti-friction bearings, hub race means having tracks for the anti-friction bearings, the two tracks of the hub race means being fixedly spaced apart axially by means located between said two tracks and the two tracks of the axle race means being arranged for axial adjustment relative to each other, abutment means adjustably and releasably secured to the axle and in abutting relation with an outer end of the axle race means, concentric restraining means encircling the axle at the inner end of the hub, an abutment within the wheel hub directed toward the inner end of the wheel hub and in abutting relation with the hub race means, and means for adjustably pressing said concentric restraining means outwardly toward the inner end of the hub race means whereby the inward movement of said hub race means relative to the hub is limited, said pressing means being releasably and adjustably secured to the wheel structure and at least a part of said pressing means being located externally of said wheel hub, and said pressing means being operable from the outer side of the wheel structure.

24. The combination with an axle, of a wheel structure having a wheel hub encircling the axle and having an upright sealing wall at its outer end, at least two sets of anti-friction bearings between the hub and axle, axle races for the anti-friction bearings mechanically separated from each other for relative axial movement, an abutment shoulder secured to the axle to restrain inward movement of one of the axle races relative to the axle, abutment means adjustably and releasably secured at the outer end of the axle in abutting relation with the outer end of one of the axle races, concentric restraining means, encircling the axle at the inner end of the hub, hub race means for the anti-friction bearings, an abutment within the wheel hub adjacent the end of the axle and directed toward the inner end of the wheel hub in abutting relation with an outer end of the hub race means, means for adjustably pressing said concentric restraining means outwardly toward the inner end of the hub race means whereby the inward movement of said hub race means relative to the hub is limited, said pressing means being releasably and adjustably secured to the wheel structure at least in part externally of said hub and extending outwardly from said restraining means toward the outer side of said wheel structure.

25. The combination with an axle, of a wheel structure having a wheel hub encircling the axle and having an upright sealing wall at its outer end integral with said hub, at least two sets of anti-friction bearings between the hub and axle, axle race means for the anti-friction bearings, abutment means adjustably and releasably secured at the outer end of the axle and in abutting relation with an outer end of the axle race means, concentric restraining means encircling the axle at the inner end of the hub, hub race means for the anti-friction bearings, an abutment within the wheel hub adjacent the end of the axle and directed toward the inner end of the wheel hub and in abutting relation with an outer end of the hub race means, screw shafts for adjustably pressing said concentric restraining means outwardly toward the inner end of the hub race means whereby the inward movement of said hub race means relative to the hub is limited, said shafts being releasably and adjustably secured to the wheel structure at least in part externally of said hub and extending outwardly from said restraining means toward the outer side of said wheel structure.

26. The combination with an axle, of a wheel structure having a wheel hub encircling the axle and having an upright sealing wall at its outer end, two annular rows of anti-friction bearings between the hub and axle, axle race means for the anti-friction bearings, abutment means adjustably and releasably secured to the axle and in abutting relation with an outer end of the axle race means, concentric restraining means encircling the axle at the inner end of the hub, hub race means for the anti-friction bearings, an abutment within the wheel hub and directed toward the inner end of the wheel hub and in abutting relation with an outer end of the hub race means, shafts for adjustably pressing said concentric restraining means outwardly toward the inner end of the hub race means whereby the inward movement of said hub race means relative to the hub is limited, apertures in the wheel structure for receiving said shafts and said apertures having a dimension along a radial axis substantially greater than the thickness of the shafts through the radial plane of said axis for adjustment of the shafts radially for easy connection of the shafts with the concentric restraining means, said shafts being releasably and adjustably secured to the wheel structure and extending outwardly from said restraining means through the said apertures toward the outer side of said wheel structure.

27. The combination with an axle, of a wheel structure having a wheel hub encircling the axle and having an upright sealing wall at its outer end, at least two sets of anti-friction bearings between the hub and axle, axle race means for the anti-friction bearings, hub race means for the anti-friction bearings, abutment means adjustably and releasably secured to the axle and in abutting relation with an outer end of the axle race means, concentric restraining means encircling the axle at the inner end of the hub and drawable axially of the hub without bodily rotation relative thereto, said restraining means having a portion extending in position to have abutting relation with only hub race means and being out of bearing engagement with the axle race means, only one of said race means including a spacing portion separating the two sets of anti-friction bearings and the other other race means having separated race portions for floating of one of said portions relative to the other, an abutment within the wheel hub directed toward the inner end of the wheel hub and in abutting relation with the hub race means, and means for adjustably pressing said concentric restraining means outwardly toward the inner end of the hub race means whereby the inward movement of said hub race means relative to the hub is limited, said pressing means being releasably and adjustably secured to the wheel structure and at least a part of said pressing means being located externally of said wheel hub and between the wheel axis and the tread of the wheel, and said pressing means being in position for operation from the outer side of the wheel structure for releasing and adjusting said restraining means.

28. In a wheel and axle structure, the combination with an axle, of a wheel structure having a wheel hub encircling the axle with a substantially closed outer end, said wheel structure having a tread portion integral with said hub, at least two sets of anti-friction bearings between the hub and axle, axle race means for the anti-friction bearings, hub race means for the anti-friction bearings, only one of said race means including a spacing portion separating the two sets of anti-friction bearings and the other race means having separated race portions for floating of one of said portions relative to the other, an abutment within the wheel hub directed toward the inner end of said hub and in abutting relation with the hub race means, abutment means adjustably and releasably secured to the axle and in abutting relation with an outer end of the axle race means, concentric restraining means encircling the axle at the inner end of the hub and drawable axially of the hub without bodily rotation relative thereto, said restraining means having a portion extending in position to have abutting relation with only hub race means and being out of bearing engagement with the axle race means, pressing means having interengagement with the restraining means and passing through the wheel structure between the wheel axis and the tread portion of the wheel and accessible from the outer face of the wheel for releasing and adjusting said restraining means, and means for sealing the inner edge portion of the concentric restraining means about the axle.

HUGH W. SANFORD.